US007620562B2

(12) United States Patent
Henry et al.

(10) Patent No.: US 7,620,562 B2
(45) Date of Patent: Nov. 17, 2009

(54) ONLINE INSTALLATION SCHEDULING SYSTEM AND METHOD FOR CABLE SERVICES

(75) Inventors: Jeffrey L. Henry, San Antonio, TX (US); Robert W. Coughlin, Jr., Cary, NC (US); Donald G. Monteyne, Wayne, NJ (US)

(73) Assignee: Time Warner Cable, Inc., Stamford, CT (US)

( * ) Notice: Subject to any disclaimer, the term of this patent is extended or adjusted under 35 U.S.C. 154(b) by 885 days.

(21) Appl. No.: 11/020,060

(22) Filed: Dec. 22, 2004

(65) Prior Publication Data

US 2005/0172325 A1     Aug. 4, 2005

Related U.S. Application Data

(60) Provisional application No. 60/532,444, filed on Dec. 24, 2003.

(51) Int. Cl.
*G06F 9/46* (2006.01)
(52) U.S. Cl. .................................. 705/9; 705/7; 705/8
(58) Field of Classification Search ............... 705/5, 705/8, 9
See application file for complete search history.

(56) References Cited

U.S. PATENT DOCUMENTS

| | | | | | |
|---|---|---|---|---|---|
| 5,615,121 | A | * | 3/1997 | Babayev et al. | 705/9 |
| 5,920,846 | A | * | 7/1999 | Storch et al. | 705/7 |
| 5,970,466 | A | * | 10/1999 | Detjen et al. | 705/8 |
| 6,304,647 | B1 | * | 10/2001 | Frost | 379/201.12 |
| 6,389,454 | B1 | * | 5/2002 | Ralston et al. | 709/204 |
| 6,578,005 | B1 | * | 6/2003 | Lesaint et al. | 705/8 |
| 6,985,871 | B2 | * | 1/2006 | Simon et al. | 705/8 |
| 7,069,097 | B1 | * | 6/2006 | Barto et al. | 700/100 |
| 7,188,073 | B1 | * | 3/2007 | Tam et al. | 705/9 |
| 7,313,530 | B2 | * | 12/2007 | Smith et al. | 705/7 |
| 7,359,864 | B2 | * | 4/2008 | Carlson et al. | 705/9 |
| 2001/0047285 | A1 | * | 11/2001 | Borders et al. | 705/8 |
| 2002/0181685 | A1 | * | 12/2002 | Doherty et al. | 379/201.12 |
| 2003/0061087 | A1 | * | 3/2003 | Srimuang | 705/8 |

(Continued)

OTHER PUBLICATIONS

Go2Broadband Affiliate Users's Guide (www.cablelabs.com/projects/go2, as archived by web.archive.org Dec. 4, 2002).*

(Continued)

*Primary Examiner*—Scott L Jarrett
*Assistant Examiner*—Alan Miller
(74) *Attorney, Agent, or Firm*—The Marbury Law Group, PLLC (57) ABSTRACT

A system and method for creating, scheduling, and managing time slots for installation appointments. Embodiments of the present invention permit a trading partner to offer a customer the ability to schedule installation of cable services on-line. A cable operator maintains an inventory of time slots. One or more time slots from the time slot inventor are offered to a customer based on ordering information received from the customer. A customer selects a time slot from the one or more offered time slots. A cable operator then assigns an installation appointment to the customer within the time slot selected by the customer. A cable operator may also determine the status of the inventory of time slots (e.g., time slots allocated, time slots consumed, and time slots available) for a system, a location, or a trading partner.

17 Claims, 5 Drawing Sheets

U.S. PATENT DOCUMENTS

2005/0027580 A1* 2/2005 Crici et al. .................... 705/8

OTHER PUBLICATIONS

Jones, Stuart, (Heuristics to Schedule Service Engineers Within Time Windows, Journal of the Operational Research Society, vol. 46, 1995, pp. 339-346).*

Descartes.com (Web Pages, Mar. 20, 2000—e-scheduler (pp. 7 - 9)).*

Smith, Stephen, (Reactive Scheduling System Brown D. et al., Intelligent Systems, 1994).*

Shade, J.J.; Orman, A.J. (Scheduling installations in the telecommunications industry, European Journal of Operational Research, vol. 102, 1997, pp. 73-87).*

Weigel, Don et al., (Applying GIS and OR Techniques to Solve Sears Technician-Dispatching and Home-Delivery Problems Interfaces, Jan.-Feb. 1999, vol. 29, No. 1, pp. 112-130).*

* cited by examiner

ONLINE INSTALLATION SCHEDULING SYSTEM AND METHOD FOR CABLE SERVICES

CROSS REFERENCE TO RELATED APPLICATIONS

This application claims priority under 35 U.S.C. § 119(e) from provisional application No. 60/532,444 filed Dec. 24, 2003. The 60/532,444 provisional application is incorporated by reference herein, in its entirety, for all purposes.

BACKGROUND

The present invention relates in general to provisioning of cable services in a cable system. More specifically, the present invention relates to an online installation scheduling system for high-speed digital services in a cable network.

The increasing popularity of high-speed data (HSD) over cable presents a significant challenge to cable operators to provision customers with the HSD services they desire. Revenue opportunities in the cable industry have evolved along multiple paths as cable-based services and supporting technologies have matured. Video services have evolved from analog and digital video to advanced video services including interactive TV and video-on-demand (VOD). In the past, a few companies dominated high-speed data (HSD) services with multiple system operators (MSOs) providing local distribution. Many cable companies are now moving aggressively to provide their own internal HSD networks, including access to multiple Internet service providers (ISPs). Cable telephony is progressing from secondary and primary line service using circuit-switched technologies to a full range of voice-over-IP (VoIP)-based telephony services, offering custom features and advanced intelligent network services that rival the incumbent local exchange carriers (ILECs).

Typically, cable operators have maintained separate work centers, support systems and skilled technicians for video, HSD and, more recently, telephony. New services have been introduced over time, often with separate back office ordering, billing, dispatch and provisioning platforms. However, the convergence of these services within an IP-based environment makes this operational model inefficient and ineffective. One catalyst for changing this model is the increasing popularity of VoIP telephony, which shares common IP network infrastructure and customer premises equipment with high-speed data services.

With the passage of the Telecommunications Act ("the Act") of 1996, an ILEC, the regulated entity that owns and administers an existing access network must provide to a requesting telecommunications carrier (the "competitive local exchange carrier" or "CLEC") nondiscriminatory access to network elements on an unbundled basis and allow CLECs to combine such network elements in order to provide telecommunications service. ILECs also have a duty to provide to CLECs interconnection with their network for the transmission and routing of telephone exchange service and exchange access. The interconnection contemplated by the Act provides nondiscriminatory access or interconnection to such services or information as are necessary to allow the requesting CLEC to implement local dialing parity, including nondiscriminatory access to telephone numbers, operator service, directory assistance, and directory listing, with no unreasonable dialing delays.

The provisions of the Act have demonstrated a need for competing exchange carriers to be interconnected so that customers can seamlessly receive calls that originate on another carrier's network and place calls that terminate on another's carrier's network without performing additional activities, such as dialing extra digits, etc. A cable provider desiring to provide VoIP services directly to customers either acts as a CLEC or partners with a CLEC.

Vestiges of the separate service mentality are easily identified. While many customers are now ordering two or more services, some cable operators still maintain a separate customer service representative (CSR) workforce for each service, often using separate ordering and billing systems for each service, and sometimes using a "notes" field to identify service installations that could be coordinated into a single truck roll. A far more efficient approach is to integrate CSR workforces across services and to implement an integrated ordering system environment, either through replacement of old systems or by establishing interfaces that integrate the old systems in an efficient manner. However, this objective is easier stated than achieved.

Significant differences exist in work management, work processes and applications supporting advanced video services, HSD and telephony. Advanced video services require service management and network provisioning applications supporting VOD servers and interactive video services. High-speed data back office operations include managing HSD content servers, e-mail servers and multiple ISP connections. Cable modem installations are migrating to a retail model, in which HSD customers are responsible for completing their own installation.

The work process issues are further complicated when the cable operator offers VoIP services. In the circuit switched environment, the ILEC receives a local service request (LSR) from a CLEC providing service to a customer. The LSR provides detailed data regarding the customer, the CLEC (if applicable) and the services desired by the customer. Circuit-switched and VoIP telephony back office operations for primary line service may require several days of preparation prior to, during, and after the day of install, including:

Communications with the customer's incumbent local exchange carrier (ILEC);

Preparation and implementation of directory listing and directory assistance records;

Preparation and implementation of the E911 record;

Preparation and implementation of the line information database record;

Preparation and transmittal of the customer care record to the interexchange carrier;

Calling number update to the calling number database;

Provisioning of customer line(s) and associated features in the cable operator's circuit switch or softswitch; and Porting of the customer's existing telephone number from the existing local exchange carrier to the cable operator's circuit switch or softswitch (also referred to as a media gateway controller).

The ordering of HSD and related services has been significantly improved by the implementation of Go2Broadband$^{SM}$ (G2B), a service of CableLabs®. An open-platform, standardized solution, G2B enables:

Consumers to obtain real-time answers about the availability of high-speed data and other services offered by cable operators for their address. In addition, consumers can place an order easily for service(s) offered.

Affiliates to receive serviceability information from cable operators in order to market cable-related products such as DOCSIS™ cable modems, set-top boxes and various cable operators' services.

Cable operators to communicate directly with consumers and affiliates regarding digital service offerings, opening alternate channels for retailers, PC manufacturers, online companies etc., to market their services thus increasing the sales footprint.

The G2B process begins when a customer at an affiliate site (e.g., retail kiosk, Web site) submits a query to G2B, requesting the availability of digital cable services. G2B then contacts the participating cable operator who responds with information on its service offerings to the customer or affiliate. After viewing the cable service offerings, a second set of messages is then used to enable the order to be placed directly with the cable operator for activation. One of the key advantages to G2B is that the same message set and structure will work with all cable operators participating with G2B.

While G2B simplifies and automates the ordering process, HSD and related services must still be provisioned to the customer. A first-time customer may require the installation of a cable drop to the house. A customer with cable service may require assistance in installing and configuring customer premises equipment (CPE) for one or more services. Scheduling an installation appointment requires coordination of task owners within and without the cable operator's organization.

An installation time slot is a valuable commodity. Coordinating the installation slot with the customer, the installer, the equipment provider, and cable operator can be a daunting task. Typically, an installation slot is allocated as follows:

A trading partner takes an order from a customer (either through a customer service representative or an on-line application).

The trading partner user interface obtains the customer qualification (including zip+4 info) and engages G2B to generate a lead based on qualification data.

The lead is saved in a database.

The cable operator at the division level pulls the lead data and sends it to a CSR to schedule installation.

An installation database is updated such that the trading partner can pull information and communicate and/or confirm with customers as desired.

The problem with this approach is that the scheduling of the installation time slot is done off-line by a CSR and then manually posted to a database for viewing by the trading partner. The trading partner cannot schedule the installation or advise the customer of the installation until the cable operator has acted. Additionally, time slots are not coordinated across all of the services requested by a customer (which may have been ordered through different trading partners). Further, there is no means for monitoring the need for time slots, whether time slots are being used efficiently, or to allocate additional time slots for a particular trading partner.

What would be useful would be a system for creating, scheduling, and managing time slots for installation appointments. Such a system would permit a trading partner to offer a customer the ability to schedule installation on-line and the cable operator to maintain an inventory of time slots for each of its trading partners. The system would additionally permit the cable operator to monitor time slot use and change an allocation (e.g. change or shift allocation hourly/daily/weekly) and receive alerts relating to time slot availability and usage.

SUMMARY

An embodiment of the present invention is a system for creating, scheduling, and managing time slots to install HSD services in a cable network. In this embodiment, a time slot comprises a maximum number of installation appointments. The cable operator maintains an inventory of time slots. One or more time slots from the time slot inventory are offered to a customer based on ordering information received from the customer. The customer selects a time slot from the one or more offered time slots. The cable operator then assigns an installation appointment to the customer within the time slot selected by the customer.

It is an aspect of the present invention to present available installation time slots online to permit reservation by trading partners.

It is another aspect of the present invention to present a block of available installation time slots to a trading partner.

It is still another aspect of the present invention to make time slots available for selection by a customer.

It is yet another aspect of the present invention to permit the cable operator to determine the status of the inventory of time slots (e.g., time slots allocated, time slots consumed, and time slots available) for a system, a location, or a trading partner.

It is a further aspect of the present invention to permit the cable operator to control the replenishment of time slot allocations and to allocate additional time slots based on demand.

It is an aspect of the present invention to warn a cable operator when an allocation of time slots reaches a specified level or when an allocation of time slots remains unused over a specified period of time.

It is yet another aspect of the present invention to permit a cable operator to structure the presentation of time slots online as a common pool, by trading partner, or by the internal organization of the cable operator.

It is still another aspect of the present invention to select the information displayed to a customer over an on-line interface based on the ordering information associated with that customer.

It is a further aspect of the present invention to integrate online installation and service requests and responses to a customer billing process.

It is an aspect of the present invention to schedule time slots based on the services requested and the turn-around time of third party service providers.

These and other aspects of the present invention will become apparent from a review of the general and detailed descriptions that follow.

An embodiment of the present invention provides a method for scheduling installation of services from a cable operator. Ordering information for a service is received from a perspective customer via an order interface. In an embodiment of the present invention, the ordering interface is an online interface. In another embodiment of the present invention, the ordering interface uses a Go2Broadband$^{SM}$ service. In yet another embodiment of the present invention, the ordering information comprises customer's name, address, contact number, and payment information. An offered time slot is selected from a time slot inventory comprising time slots based on the ordering information. The offered time slot is offered to the prospective customer via the order interface. A selected time slot is received from the perspective customer via the order interface and the installation of the service is scheduled within the selected time slot. In an embodiment of the present invention, the service is selected from the group consisting of high-speed data service, voice over IP service, and video service.

In another embodiment of the present invention, before receiving ordering information, service qualifying information is received. A determination is made from the service qualifying information whether the service is available to the prospective customer. In an embodiment of the present invention, service qualifying information is selected from the group consisting of a zip code and a street address.

In yet another embodiment of the present invention, before offering the time slot for installation of the service, order qualifying information is received. A determination is made from the order qualifying information whether the potential customer may use the order interface. In an embodiment of the present invention, order qualifying information comprises affirmative responses to questions directed to whether the prospective customer lives in a house, whether the house is wired for cable services, and whether a cable outlet is within a threshold distance of a computer.

In yet another embodiment of the present invention, the time slot inventory comprises a common slot pool and a reserved slot pool. In this embodiment, the selection of the offered time slot from the time slot inventory is based on the ordering information. From the ordering information, a determination is made whether the prospective customer is entitled to a time slot held in the reserved slot pool. If the prospective customer is entitled to the time slot held reserve slot pool, the time slot is selected from the reserve slot pool.

In an embodiment of the present invention, the cable operator comprises organizational units and the reserved slot pool is associated with an organizational unit. In this embodiment, the ordering information associates the prospective customer with the organizational unit.

In another embodiment of the present invention, the cable operator offers services of trading partners and the reserved slot pool is associated with a trading partner unit. In this embodiment, the ordering information associates the prospective customer with the trading partner.

In still another embodiment of the present invention, the reserved slot pool comprises times slots grouped by time periods.

In an embodiment of the present invention, a time slot comprises installation appointments. In this embodiment, an installation appointment is assigned to the perspective customer within the selected time slot.

In another embodiment of the present invention, the time slot inventory comprises time slots. An alert trigger is established for a time slot. An alert message is received if the alert trigger is met. In an embodiment of the present invention, the alert message is an e-mail message.

In still another embodiment of the present invention, the time slot comprises installation appointments, and the alert trigger is "A" or fewer installation appointments over the next "B" days. In yet another embodiment of the present invention, the time slot comprises installation appointments, and the alert trigger is the earliest available installation appointment is more than "C" days away. In another embodiment of the present invention, the time slot comprises installation appointments and the alert trigger is exceeding a maximum percentage utilization for the timeslot. In this embodiment, a percentage utilization equals a number of scheduled installation appointments for the time slot divided by a maximum number of installation appointments allowed for that time slot. In yet another embodiment of the present invention, the time slot comprises installation appointments, and the alert trigger is failing to reach a minimum percentage utilization in "D" days for the timeslot. In this embodiment, a percentage utilization equals a number of scheduled installation appointments for the time slot divided by a maximum number of installation appointments allowed for that time slot.

In an embodiment of the present invention, the ordering information comprises an e-mail address of the prospective customer and the prospective customer is sent an installation reminder message to the e-mail address.

In an embodiment of the present invention, a system for scheduling installation of services from a cable operator comprises a time slot inventory comprising time slots, an order interface adapted to receive orders from a perspective customer, and a time slot management system. The time slot management system is adapted to receive ordering information for a service from the perspective customer via the order interface, select an offered time slot from a time slot inventory comprising time slots based on the ordering information, offer the offered time slot to the prospective customer via the order interface, receive from the perspective customer a selected time slot via the order interface, and schedule the service for installation within the selected time slot.

In still another embodiment of the present invention, the time slot management system is further adapted to, before receiving ordering information, receive service qualifying information, and determine from the service qualifying information whether the service is available to the prospective customer.

In another embodiment of the present invention, the time slot management system is further adapted to, before offering the time slot for installation of the service, to receive order qualifying information, and to determine from the order qualifying information whether the potential customer may use the order interface.

In an embodiment of the present invention, the time slot inventory comprises a common slot pool and a reserved slot pool. In this embodiment, the time slot management system is further adapted to, from the ordering information, determine whether the prospective customer is entitled to a time slot held in the reserved slot pool. If the prospective customer is entitled to the time slot held reserve slot pool, select the time slot from the reserve slot pool. In yet another embodiment of the present invention, a time slot comprises installation appointments and the time slot management system is further adapted to assign the prospective customer an installation appointment within the selected time slot.

In still another embodiment of the present invention, the time slot inventory comprises time slots, and the time slot management system is further adapted to establish an alert trigger for a time slot, and receive an alert message if the alert trigger is met.

In an embodiment of the present invention, ordering information comprises an e-mail address of the prospective customer. In this embodiment, the time slot management system is further adapted to send the prospective customer an installation reminder message to the e-mail address.

DETAILED DESCRIPTION

The following definitions are provided for the purpose of clarity:

CLEC—Competitive local exchange carrier.
CSR—Customer service representative of a cable network operator.
G2B—Go2Broadband$^{SM}$ (G2B), a service of CableLabs®. An open-platform, standardized solution for Web-based HSD ordering.
HSD—High-speed data.
ILEC—Incumbent local exchange carrier.
MAC—Media access control.
MTA—Media terminal adapter.
Trading partner—A supplier of a CLEC responsible for providing some aspect of the service to the subscriber.
VoIP—Voice over Internet Protocol.

An embodiment of the present invention is a method using time slot management system (TSMS) to create, schedule, and manage time slots to efficiently provision, install, and maintain HSD services in a cable network. For the purposes of clarity, in the discussion that follows a time slot is any multiple of fifteen-minute intervals starting at an even hour. Each time slot has a maximum number of installation appointments associated with it. As will be clear to those skilled in the art, other intervals and reference points made be used to determine a time slot without departing from the scope of the present invention.

Figure 1:
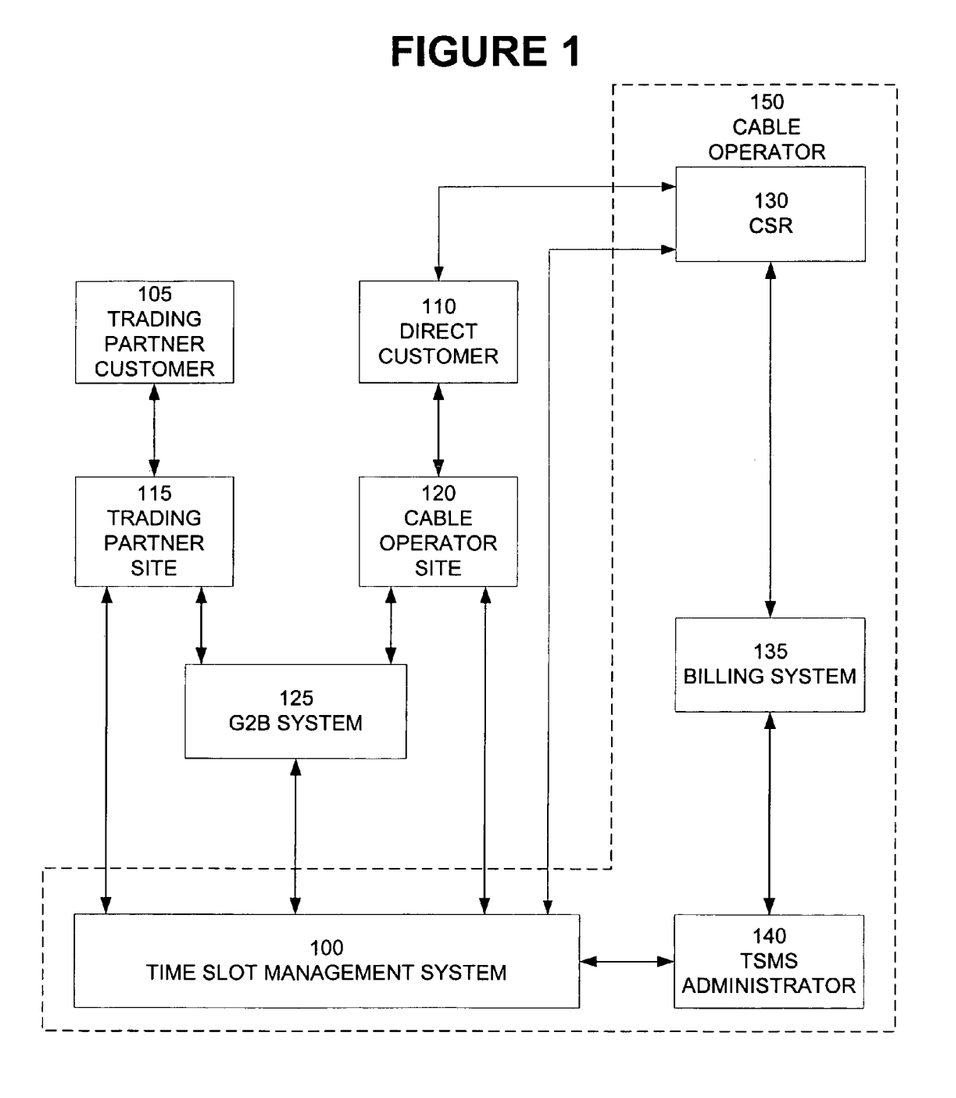
FIG. 1 illustrates a block diagram of a high-level view of a time slot management system (TSMS) incorporated into an online scheduling system according to an embodiment of the present invention.

FIG. 1 illustrates a block diagram of a high-level view of a TSMS incorporated into an online scheduling system according to an embodiment of the present invention. Referring to FIG. 1, a TSMS 100 is accessible to a trading partner customer 105, a direct customer 110, a customer service representative (CSR) 130 and a TSMS administrator 140 of a cable operator 150. The level of accessibility of an entity is determined by permissions (permissions will be discussed is subsequent sections).

The TSMS 100 is configurable by the cable operator 150, meaning the way the TSMS manages time slots is under the control of the TSMS administrator 140. Additionally, the TSMS 100 is accessible by customers placing orders for HSD service directly with the cable operator (a direct customer 110) or through a trading partner (a trading partner customer 105). The TSMS 100 is also adapted to receive an order from a website operated by the trading partner (trading partner site 115) or a cable operator site 120. A customer may initiate a service inquiry through the G2B system 125 linked to trading partner site 115.

FIG. 1 further illustrates that the activities of the TSMS 100 interact with the operation of the billing system. This interaction reflects the improved timeliness of data flow to the billing system resulting from improved knowledge of the scheduling and completion of installation F afforded by the TSMS 100.

Figure 2:
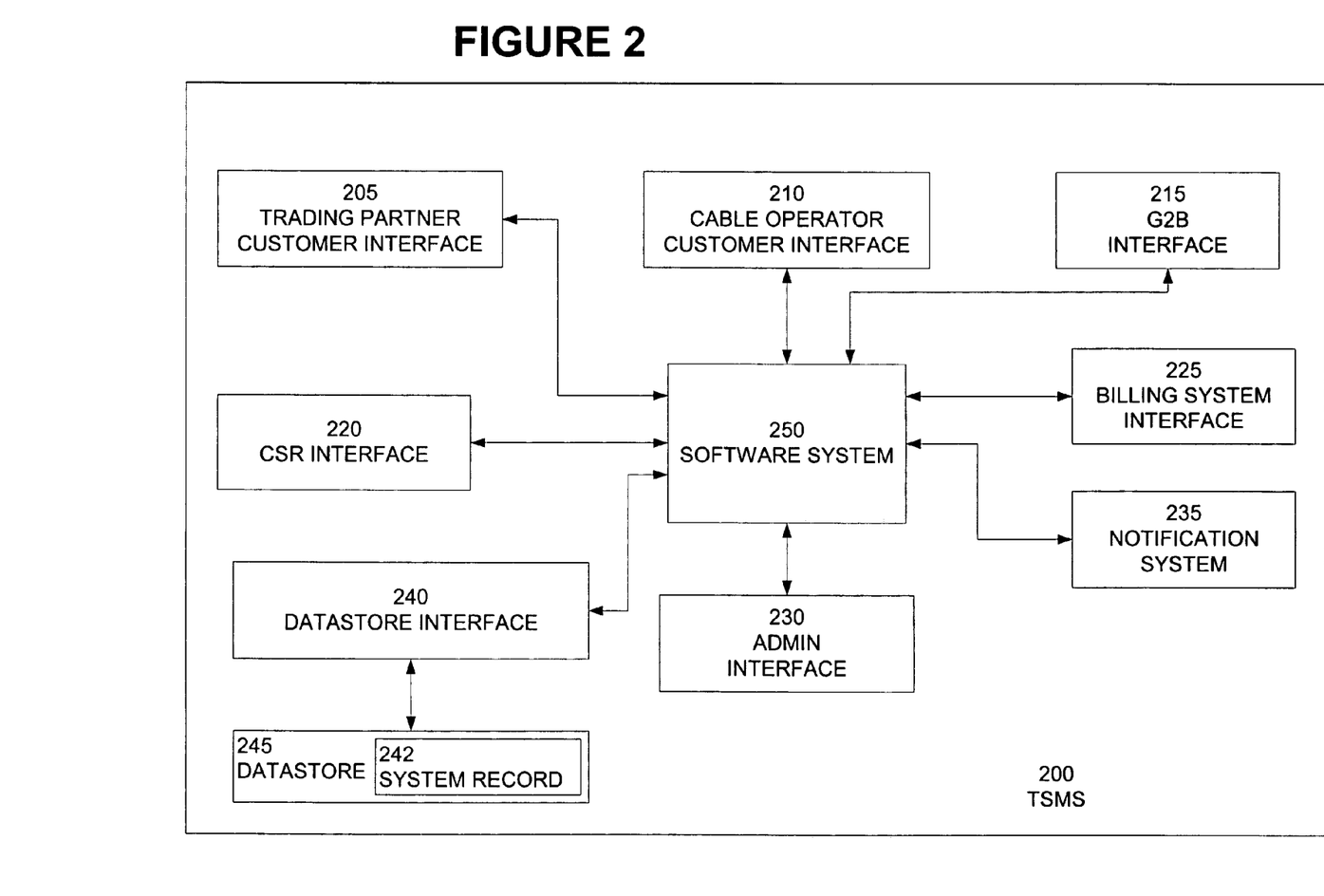
FIG. 2 illustrates a block diagram of the logical components of a time slot management system according to an embodiment of the present invention.

FIG. 2 illustrates a block diagram of the logical components of a time slot management system according to an embodiment of the present invention. Referring to FIG. 2, TSMS 200 comprises a trading partner customer interface 205, a cable operator customer interface 210, a G2B interface 215, a CSR interface 220, a billing system interface 225, and an administrator interface 230, all under the control of a software system 250. The software system 250 communicates with a datastore 245 through datastore interface 240. In this embodiment of the present invention, a software system 250 directs the flow of queries and responses from various interfaces to a TSMS 200.

An administrator interface provides an authorized administrator access to configuration records stored in datastore 245. Through the administrator interface 230 and the software system 250, the administrator may enable on-line scheduling through the trading partner customer interface 205 and the cable operator customer interface 210. Once enabled, the administrator then configures the TSMS 200 to schedule, manage, and report time slot information according to the needs of the cable operator.

In an embodiment of the present invention, datastore 245 comprises a system record 242 of each cable system operated by a cable operator. By way of illustration and not as a limitation, the system record comprises a cable system identifier, a division identifier, and contact information (e.g., phone number(s), URL, e-mail address(es), and names of critical facility personnel). Using the administrator interface 230 of the TSMS 200, the administrator retrieves system record 242 of a cable system to be enabled or disabled to offer on-line scheduling of time slots. Enabling a cable system for on-line scheduling further enables the various interfaces and software system 250 to perform the tasks described below. Additionally, system record 242 in an enabled system further comprises time slot information for that system and access rules that determine how and by whom the time slot information may be viewed.

Figure 3:
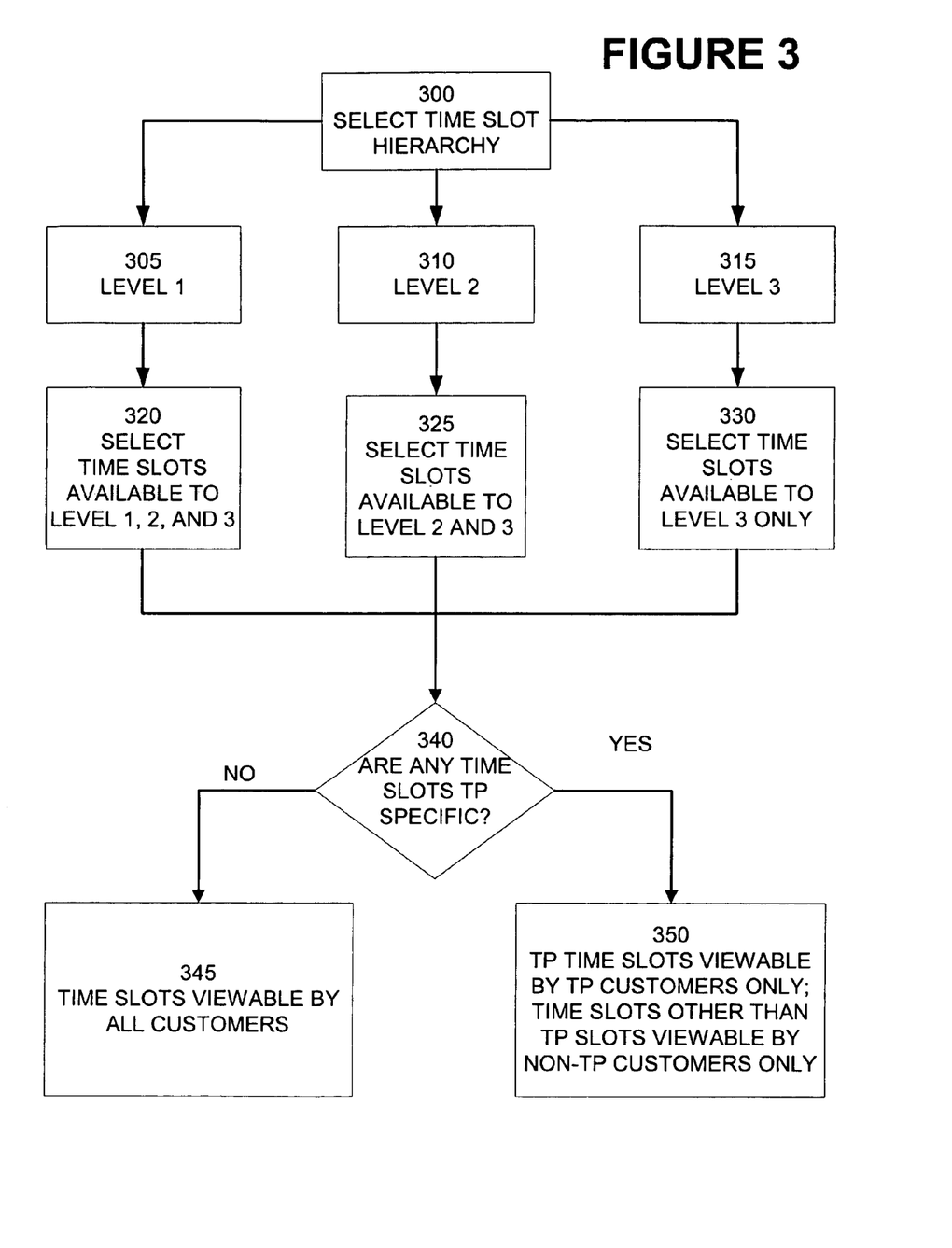
FIG. 3 illustrates an organization of time slot information using three levels according to an embodiment of the present invention.

In an embodiment of the present invention, time slot information may be organized to mirror the organization of the cable operator. FIG. 3 illustrates an organization of time slot information using three levels according to an embodiment of the present invention. As will be apparent to those skilled in the art, time slot information may be organized according to other structures without departing from the scope of the present invention.

Referring to FIG. 3, a TSMS administrator selects a time slot hierarchy from three available levels. However, the invention is not so limited. As will be appreciated by those skilled in the art, any number of levels may be defined without departing from the scope of the present invention.

In one embodiment of the present invention, the TSMS administrator selects level 1 305. Level 1 305 is a global level meaning that all time slots are available to all other organizational units within the cable operator's organization. The TSMS administrator then selects time slots available to levels 1, 2 and 3 320.

In another embodiment of the present invention, the TSMS administrator selects level 2 310. Level 2 310 represents one of a plurality of organizational units within the cable operator's organization. Time slots established for level 2 310 are available to all component organizational structures within level 2 310 (i.e., level 2 and level 3). The TSMS administrator then selects time slots available to levels 2 and 3 325.

In yet another embodiment of the present invention, the TSMS administrator selects level 3 315. Level 3 315 represents one of a plurality of organizational structures within the level 2 310. Time slots established for level 3 315 are only available to the level 3 organizational unit 315. The TSMS administrator then selects time slots available to level 3 330.

For example, a cable operator that is organized according a hierarchical structure of division-cable system-management area may organize time slots at the division level, cable system level, or within a defined management area. However, this is not meant as a limitation. As will be apparent to those skilled in the art, other time slot information organization schemes may be implemented without departing from the scope of the present invention. The TSMS operates the same regardless of the manner in which the time slot information is managed. However, time slots and resources related to the installation and servicing of HDS within a time slot are not shared in multi-level management structures without intervention by the administrator.

By way of illustration, organization of time slots at the division level permits entry of time slot information to be populated to all cable systems and management areas in a division. For example, every Tuesday from 10:00 A.M. to 12:00 P.M., four installation appointments for HSD are available. These installation appointments are available for each cable system and management area throughout a division. Organization of time slots at the cable system level populates time slot information across the whole cable system. For example, every Wednesday from 1:15 P.M. to 4:30 P.M., six installation appointments for HSD are available. These installation appointments are available for each management area within the cable system in a division. Organization of time slots at the management area level permits entry of time slot information to be populated to a particular management area in a division. For example, every Saturday from 8:30 a.m. to 11:45 a.m., five installation appointments for HSD are available. These installation appointments are available only for a specific management area within the cable system.

As will be discussed below, HSD customers seeking to make an installation appointment online will request an available date/time selection.

Referring again to FIG. 3, time slots may be made accessible by all trading partners and customers or associated with a particular trading partner and its customers. The TSMS administrator determines whether to associate one or more time slot with a trading partner (TP) 340. If none of the time slots are associated with a particular TP, all time slots are available to (and viewable by) all customers and TPs 345. If any time slot is associated with a TP, then the time slots associated with that TP are only available to (and viewable by) the customers of the that TP and the time slots not associated with the TP are available to (and viewable by) customers that are not customers of that TP 350.

For example, every Thursday from 1:45 P.M. to 4:00 P.M., six installation appointments for HSD are available. In a pooled mode, all customers can draw from these installation appointments regardless of the trading partner associated with the customer. Alternatively, the installation appointments may be designated for trading partner "A." Only customers associated with trading partner A can access these installation appointments as a selection if there are any available installation appointments remaining.

The TSMS may also be configured to have both a pool and specific allocated time slots. For example, every Saturday from 8:00 A.M. to 10:30 A.M., thirty installation appointments for HSD are available. The administrator may allocate six installation appointments exclusively for customers associated with trading partner "A," six installation appointments available exclusively for customers associated with trading partner "B," and eighteen installation appointments reserved for all other trading partners. Customers associated with trading partners "A" and "B" are limited to the number of installation appointments set up specifically for them. Once all installation appointments within a time slot are assigned, that timeslot will not appear as a choice for those customers. Customers from other trading partners will draw installation appointments only from the general pool of time slots.

In another embodiment of the present invention, time slots are allocated by time period and by trading partner. For example, Saturday from 8:00 A.M. to 10:30 A.M., installation appointments for HSD are available only for customers associated with trading partner "A," and installation appointments from 10:45 A.M. to 12:45 P.M are available only for customers associated with trading partner "B." Installation appointments from 1:00 P.M. to 3:00 P.M., are available for customers associated with other trading partners. Customers associated with trading partners A and B are limited to viewing only the timeslot specifically set up for each. Customers associated with other trading partners are able to view only the timeslots in the general pool.

In an embodiment of the present invention, the allocation of time slots affects the information that is presented to the online customer. The TSMS determines if a customer is associated with a trading partner for the purpose of the time slot being requested and, if so, whether any time slots are allocated for that trading partner. If TSMS finds any timeslots allotted specifically to the trading partner, the information for those timeslots will be displayed. If no time slots have been allocated for the trading partner associated with the customer, only installation appointments available in a general pool will be displayed. However, the customer will not be presented both the general pool and allocated installation appointments simultaneously.

By way of illustration and not as a limitation, a customer associated with trading partner XYZ is requesting to view available installation appointments. Time slots have been allocated to trading partner XYZ but all of the installation appointments within these time slots have been assigned. While installation appointments are available in a general pool, the customer will not be able to view those installation appointments. Rather, the customer will receive a message (via the notification system 235) that a CSR will contact the customer to schedule an appointment.

Referring again to FIG. 2, in another embodiment of the present invention, the notification system 235 issues alert messages relating to time slot allocations according to parameters established by the administrator. In this embodiment, alert messages are emailed to designated recipients when preset parameters are met.

Figure 4:
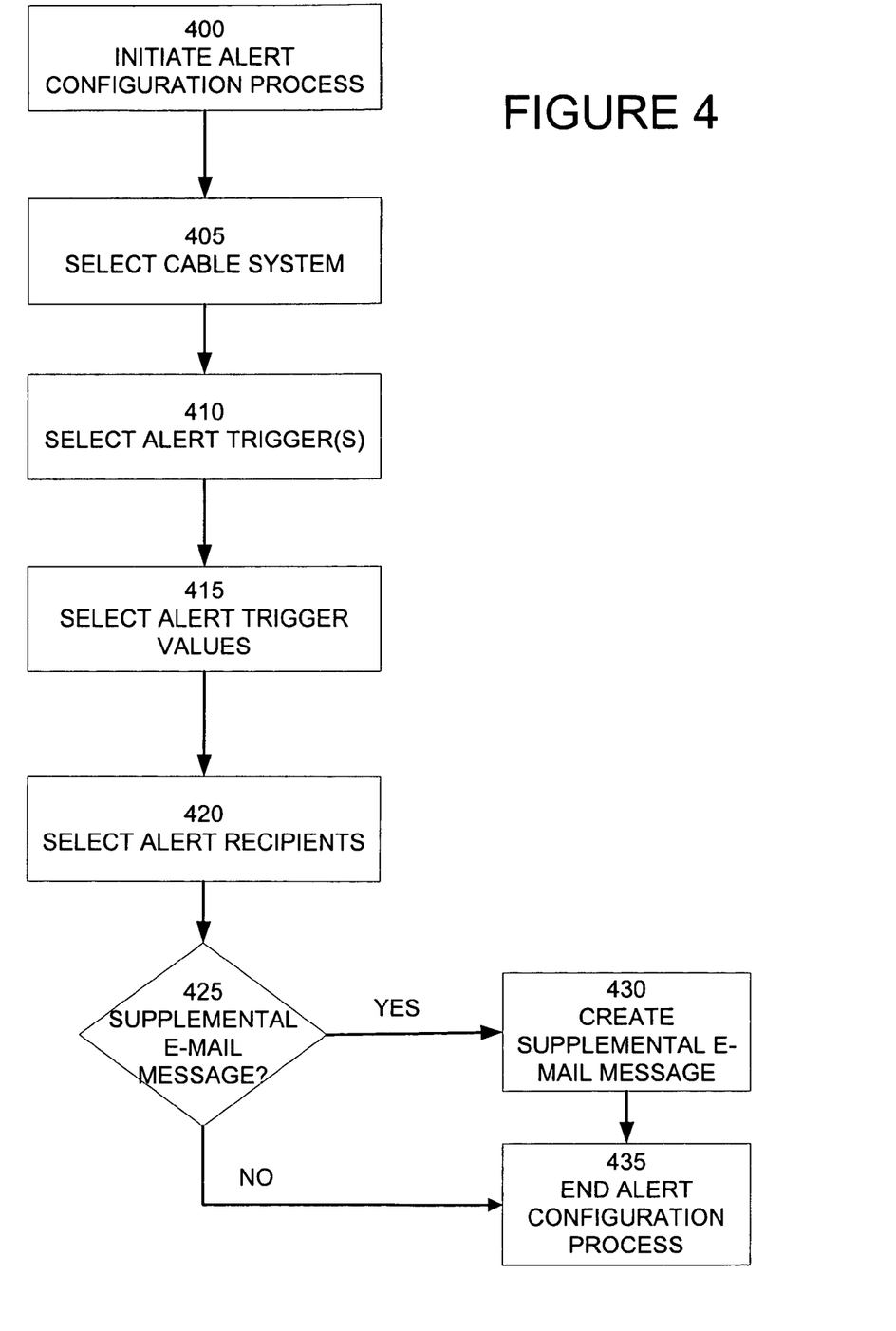
FIG. 4 illustrates a process by which a TSMS is configured at a division cable system level to send alert messages according to an embodiment of the present invention.

FIG. 4 illustrates a process by which a TSMS is configured at a division cable system level to send alert messages according to an embodiment of the present invention.

An administrator of a TSMS initiates an alert configuration process 400. The administrator selects a cable system 405 to which the alert configuration is to apply and the "triggers" 410 that will used to cause an alert to be issued.

By way of illustration, in an exemplary embodiment of the present invention, the following triggers may be set by the administrator:

When the maximum percent utilization of installs has been reached for any timeslot in the cable system.

When a pre-set minimum consumption level has not been met for any timeslot in the cable system.

When too few appointments are available looking at the cable system as a whole.

When the first appointment available is too many days out looking at the cable system as a whole.

In this exemplary embodiment of the present invention, alert parameters are configured per cable system and apply to all the management areas and timeslots within that cable system. However, this is not meant as a limitation. In another embodiment, the alert parameters are configured so as to mirror the organization of the cable operator.

The trigger values are set 415 appropriate to the alert triggers previously selected. By way of illustration and not as a limitation, an alert will triggered for the entire cable system if the following conditions are met:

"X" or fewer appointments over the next "y" days.

The earliest available appointment is more than "x" days away.

If any timeslot in any management area within the cable system meets the condition:

Maximum percentage utilization reached for a timeslot.

Minimum percentage utilization NOT reached in "X" days for a timeslot.

where the percentage utilization=number of scheduled installation appointments within a time slot divided by the total number of installation appointments associated with that time slot.

Referring again to FIG. 4, the administrator identifies the recipients of the alert 420. In this embodiment, an alert will be sent to the designated recipients once a day per type of alert with all information relating to the alert parameters for that alert type within the cable system. The administrator may choose to add a supplemental message 425 to the alert e-mail. If a supplemental message is desired, it is created 430 by the administrator. If a supplemental message is not desired, or if desired, following its creation, the alert configuration process ends 435.

Referring again to FIG. 2, in another embodiment of the present invention, the administrator interface 230 also provides information regarding time slot usage on line. The administrator may choose to view the time slot usage for an entire division, for a particular cable system, for a specific management area, for the general pool of trading partners, or a specific trading partner. Additionally, through the administrator interface 230, the administrator may update the number of installation appointments for any of the timeslot and limit the ability of a particular timeslot to be viewed online.

The administrator interface 230 provides a structured means of modifying a time slot allocation and redefining the number of installs associated with that time slot. In an embodiment of the present invention, the administrator interface uses drop down menus to offer options to the administrator to establish (or re-establish) time slot allocation for specific days of the week over a specified time period for either a general pool or one or more specific trading partners. The time slot is specified by a start time and an end time. Additionally, a number of installation appointments associated with that time slot is specified. The data that is presented to the administrator is stored in system record 242 in datastore 245. Upon modifying a data field, the datastore notification system 235 displays a confirmation statement to the administrator reflecting the data as entered by the administrator and requests confirmation from the administrator. If the changed is confirmed, the new data is stored in system record 242. A final confirmation statement is then issued by the notification system 235 and displayed to the administrator.

In yet another embodiment of the present invention, the notification system 235 issues an alert if a change made to an existing time allocation or installation appointment causes a conflict with other alert parameters or existing installation appointments. By way of illustration and not as a limitation, an error message will be issued if:

all required fields are not completed;

a "To" date is entered that is before an associated "From" date; or an invalid month/day combination is entered (e.g., Feb. 31).

If data is entered that conflicts with information already stored in the applicable system record 242, an overwrite confirmation message will be sent by the notification system 235. For example, the following message may be issued:

"The following time slots exist in the database. In some cases the total number of installs you entered is lower than the number of installs currently consumed or you are choosing to hide the time slots with appointments scheduled. Press submit to replace the data or cancel to cancel your entire request. You may also go back and edit your selection."

The administrator may confirm the overwrite message to make the changes despite the warning.

Referring again to FIG. 2, trading partner customer interface 205 and cable operator customer interface 210 represent different entry points to the TSMS 200 but perform substantially the same tasks. The entry point of a customer determines whether a customer has a relationship with a trading partner for the purposes of ordering a service and scheduling an installation appointment. As previously discussed, a customer's access to time slots may depend on whether the customer is associated with a trading partner at the ordering stage. For the purposes of this discussion, the interfaces will be treated as logical equivalents and only the trading partner customer interface will be discussed in detail.

Figure 5:
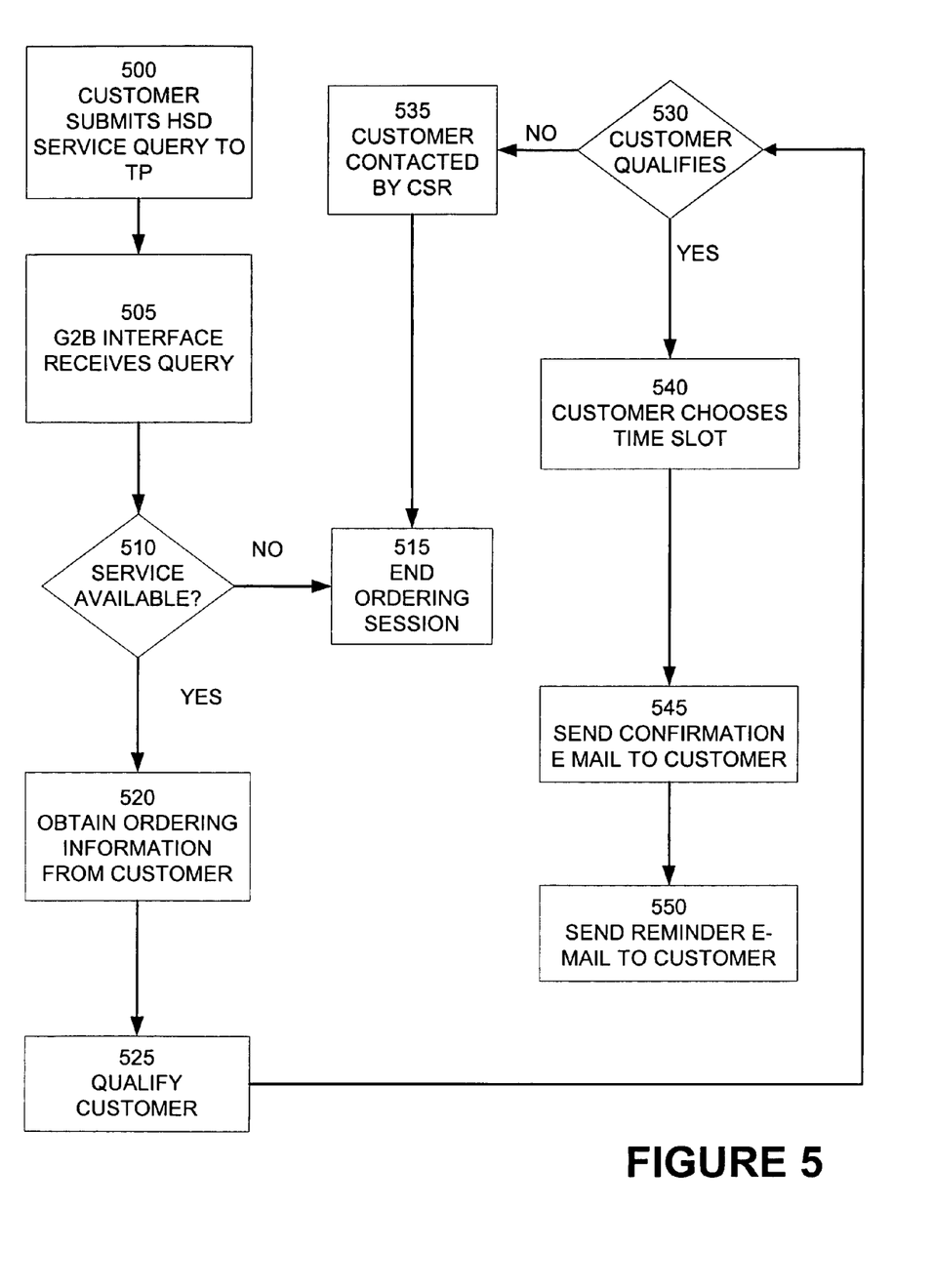
FIG. 5 illustrates the coordination of a G2B interface and a customer interface according to an embodiment of the present invention.

FIG. 5 illustrates the coordination of a G2B interface and a customer interface according to an embodiment of the present invention. In an embodiment of the present invention, the trading partner customer interface (205—see FIG. 2) is coordinated with the operation of G2B interface (215—see FIG. 2). In this embodiment, a customer may request an assessment of service availability through participating trading partners of the cable operator that uses the G2B system. The G2B interface 215 receives query messages and issues responses regarding the availability of service based on the location of the customer. If the customer is located in an area served by the cable operator, the trading partner interface 205 presents the customer with ordering information.

Referring to FIG. 5, a customer submits an HSD service inquiry to a trading partner of a cable operator 500. The inquiry is received by the G2B interface 505 and a determination is made whether the customer is within the service area of the cable operator 510. If service cannot be provided to the customer, the service ordering session ends 515. If service can be provided to the customer, ordering information is obtain from the customer 520. By way of illustration, ordering information may include the customer's name, address, contact number, and payment information.

Upon completion of the ordering information, the customer is then presented with a set of qualification questions 525 to determine whether the customer qualifies to use the online scheduling features of the TSMS 530 and to provide information useful to assess the time and resources needed for installation.

Referring again to FIG. 2, the qualification questions reside in the system record 242 and are configured by the administrator through the administrator interface 230. In this embodiment of the present invention, three questions are posed to the customer, although this is not meant to be a limitation:

1. Do you live in a house or an apartment?

2. Has this location ever been wired for cable services

3. Is a cable outlet within 4-6 feet of your PC?

All customers are required to answer all three questions in order to proceed with scheduling an appointment online. The administrator may establish that the answers to 2 or 3 or both must be "yes" in order to proceed with scheduling an appointment online.

Referring again to FIG. 5, if the customer does not qualify to schedule an installation appointment online, the customer will receive an online message via the notification system 235 that a representative will call them to schedule an appointment 535 and the online ordering session ends 515.

A "qualified" customer is presented with a range of time slots to choose to have the service installed 540. The time slots made available to the customer depend on the trading partner that the customer is associated with and the lead times configured into the TSMS 200 by the administrator.

A customer who schedules an installation appointment online and who provides an e-mail address will receive a confirmation e-mail 545 from the notification system 235 indicating the date/time requested by the customer. By way of illustration and not as a limitation, the confirmation e-mail comprises:
  Customer Name
  Service Name
  Order Acknowledgement Number
  From Time
  To Time
  Requested Installation Date
  Supplementary text entered for each cable system configurable at the cable system level The notification system 235 will also send a reminder e-mail 550 when the TSMS 200 receives a work order from the billing system 135 that has data in an Action/Time field (scheduled installation data). The administrator sets the amount of time (in days) in advance of the installation date that the notification e-mail is sent. The number of advance days is configurable at the cable system level. By way of illustration and not as a limitation, the confirmation e-mail comprises:
  Customer Name
  Address in TSMS
  Service Name
  Service Code
  Order Acknowledgement Number
  Work Order number
  From Time
  To Time
  Scheduled Installation Date
  Supplementary text entered for each cable system configurable at the cable system level Ordering information is accessible to customer service representatives (CSRs) through the CSR interface 220 or through the billing system interface 225. With respect to the billing system interface 225, scheduling data may be exported to the billing system and accessed by dispatch and installation personnel during installation.

An online order scheduling system and method for high-speed digital services has been disclosed. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for scheduling installation of services offered by a service provider comprising:
  establishing a time slot inventory, wherein the time slot inventory comprises a plurality of time slots each comprising a plurality of available installation appointments for installation of a service;
  establishing an alert trigger for, each of the plurality of time slots by a time slot management system, wherein the alert trigger is selected from the group consisting of a condition indicative of an under utilization of the plurality of available installation appointments and a condition indicative of an over utilization of the available installation appointments;
  receiving via an order interface ordering information and order qualifying information from a prospective customer, wherein the ordering information comprises a request for installation of the service and wherein the order qualifying information comprises information relating to the state of the installation location;
  qualifying the request for installation of the service for scheduling by the time slot management system;
  when the requested service qualifies for scheduling, using the time slot management system for:
    selecting from the time slot inventory at least one available time slot for installation of the service, wherein the at least one available time slot is selected based on the ordering information;
    displaying to the prospective customer an offer comprising the at least one available time slot via the order interface; and
    receiving from the prospective customer via the order interface a confirmation, wherein the confirmation comprises selection of a particular time slot of the at least one available time slot by the prospective customer;
    scheduling the installation within the selected time slot;
    displaying the selected time slot to the prospective customer;
  determining whether the condition of the alert trigger established for each of the plurality of time slots is satisfied by the time slot management system; and
  issuing an alert message when the utilization of the plurality of available installation appointments satisfies the condition of the alert trigger for any one of the plurality of time slots.

2. The method of claim 1, wherein determining whether the condition is satisfied by the time slot management system comprises determining by the time slot management system that a number of available installation appointments is less than or equal to a threshold determined over a time period.

3. The method of claim 1, wherein the plurality of installation appointments is associated with a time and date, and wherein determining whether the condition is satisfied by the time slot management system comprises determining by the time slot management system that a next available installation appointment is more than a threshold time period after a current date and time.

4. The method of claim 1 further comprising acquiring a number of appointments scheduled for each of the plurality of time slots and determining by the time slot management system a percentage utilization for each of the plurality of time slots, wherein the percentage utilization equals the number of scheduled installation appointments for a particular one of the plurality of time slots divided by a maximum number of installation appointments available for that time slot, and wherein determining whether the condition is satisfied by the time slot management system comprises determining by the time slot management system whether the percentage utilization for each of the plurality of time slots exceeds a maximum percentage utilization threshold.

5. The method of claim 1 further comprising acquiring a number of appointments scheduled for each of the plurality of time slots and determining by the time slot management system a minimum percentage utilization in a time period for each of the plurality of time slots, wherein the percentage utilization equals the number of scheduled installation appointments for a particular one of the plurality of time slots divided by a maximum number of installation appointments available for that time slot and wherein determining whether the condition is satisfied by the time slot management system comprises determining by the time slot management system whether the percentage utilization for each of the plurality of time slots is less than a minimum percentage utilization threshold.

6. The method of claim 1, wherein the alert message is an e-mail message.

7. The method of claim 1, wherein the service is selected from the group consisting of high-speed data service, voice over IP service, and video service.

8. The method of claim 1 further comprising:
when the requested service does not qualify for scheduling by the time slot management system, sending to the prospective customer a notice via the order interface that the requested service does not qualify for scheduling by the time slot management system.

9. The method of claim 1, wherein the order interface is an online interface.

10. The method of claim 1, wherein the ordering information comprises customer's name, address, contact number, and payment information.

11. The method of claim 1 further comprising: receiving service availability information;
determining from the service availability information by the time slot management system whether the service is available to the prospective customer; and
when the service is not available to the prospective customer, then sending to the prospective customer a notice via the order interface that the requested service is not available.

12. The method of claim 11, wherein service availability information is selected from the group consisting of a zip code and a street address.

13. The method of claim 1, wherein the service is a cable service, wherein the order qualifying information comprises affirmative responses to questions directed to whether the prospective customer lives in a house, whether the house is wired for the cable service, and whether a cable outlet is within a threshold distance of a computer.

14. The method of claim 1, wherein the time slot inventory comprises a common slot pool and a reserved slot pool, and wherein selecting the offered time slot from the time slot inventory based on the ordering information comprises:
determining from the ordering information by the time slot management system whether the prospective customer is entitled to a time slot held in the reserved slot pool; and
selecting the time slot from the reserve slot pool by the time slot management system when the prospective customer is entitled to the time slot held in the reserve slot pool.

15. The method of claim 14, wherein the service provider comprises organizational units and the reserved slot pool is associated with an organizational unit, and wherein the ordering information associates the prospective customer with the organizational unit.

16. The method of claim 14, wherein the service provider offers services of trading partners and the reserved slot pool is associated with a trading partner unit, and wherein the ordering information associates the prospective customer with the trading partner.

17. The method of claim 14, wherein the reserved slot pool comprises time slots grouped by time periods.

* * * * *